P. A. WEIGEL.
STEERING CONTROLLER.
APPLICATION FILED OCT. 13, 1919.
1,350,285.
Patented Aug. 17, 1920.
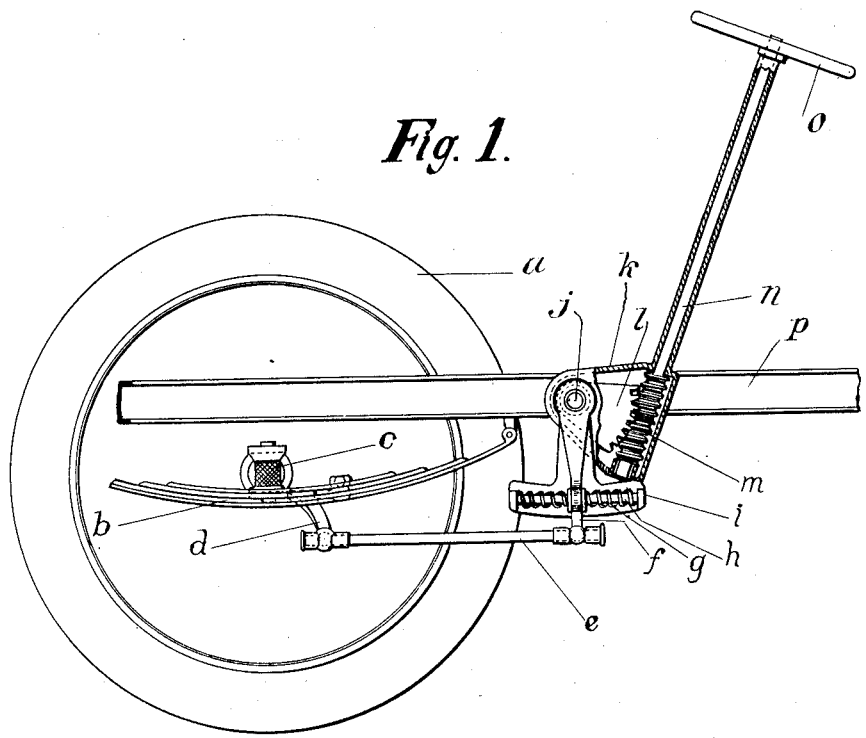
Fig. 1.
Fig. 2.
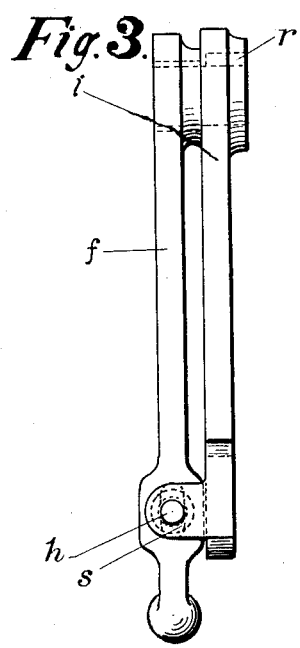
Fig. 3.
Inventor
Philip A. Weigel.
By M. Van Boorkirk
his Attorney

UNITED STATES PATENT OFFICE.

PHILIP A. WEIGEL, OF RIVERTON, NEW JERSEY, ASSIGNOR OF ONE-THIRD TO EDWARD GUMBEL AND ONE-THIRD TO GENEROSO DI GIACOMO, BOTH OF PHILADELPHIA, PENNSYLVANIA.

STEERING-CONTROLLER.

1,350,285.      Specification of Letters Patent.      Patented Aug. 17, 1920.

Application filed October 13, 1919. Serial No. 330,233.

*To all whom it may concern:*

Be it known that I, PHILIP A. WEIGEL, a citizen of the United States, residing at Riverton, in the county of Burlington and State of New Jersey, have invented certain new and useful Improvements in Steering-Controllers, of which the following is a specification.

The object of my invention is to provide a device that will prevent accidents to the front wheels or steering mechanism of automobiles in case the front wheels come in contact with a stone, rut or other obstacle in the road while the car is in motion, and such other objects as shall hereinafter appear.

For a full understanding of the invention and the merits thereof and also to acquire a knowledge of the details of construction and the means for effecting the result, reference is to be had to the following description and accompanying drawings, in which Figure 1 illustrates the device attached to an automobile frame.

Fig. 2 is a detail view of the device and Fig. 3 is a view taken on the line 2—2 of Fig. 2.

Similar reference characters refer to similar parts throughout the drawings.

The letter $a$ represents the front wheel of an automobile which is mounted on the swivel part $d$ of the front axle $c$. The spring $b$ carrying the front axle $c$ is fastened to the main frame $p$ to which is journaled the stud shaft $j$ and on which is rigidly mounted the T-lever $i$ by the key $r$; also mounted thereon is the worm-gear-segment $l$ which engages worm $m$ mounted solidly with spindle $n$, to which the steering hand-wheel $o$ is fixed.

Mounted on the T-lever $i$ at its support, and co-axially therewith, is the ball lever $f$.

The said ball lever $f$ is slotted, as shown at $s$ in Fig. 3, to pass the bar $h$ which is secured to the T-lever $i$ by means of pins $t$ through openings in lugs $u$ provided integral with said bar $h$ at each end thereof.

The bar $h$ as aforesaid, is provided at each end with the integral lugs $u$. Washers $q$ are provided on said bar $h$ on either side of the slotted opening $s$ in said ball lever $f$. Spiral springs $g$ are positioned around said bar $h$ and between said lugs $u$ and washers $q$, all as particularly illustrated in Fig. 2. When the hand-wheel $o$ is rotated motion is imparted to the T-lever $i$ through the worm and gear-segment $l$, the T-lever $i$ thereby imparting motion to the ball-lever $f$, by the compression of the springs $g$ between the lugs $u$ and washers $q$, in either direction, according to the direction of rotation of the hand-wheel $o$.

By the resistance to compression of springs $g$, the motion in the T-lever $i$ causes motion in the ball-lever $f$ which further imparts motion, through the connecting rod $e$ to the swivel of front axle $c$ to the front wheel $a$ thereby steering same.

Without the cushion effect of these compression springs $g$ the front wheel in coming in contact with a stone or rut in the roadway would cause damage to the wheels or steering mechanism as the hand-wheel $o$ cannot be turned by turning the front wheel $a$.

Having thus described my invention what I claim as new and desire to secure by Letters Patent is:

1. In a steering controller the combination with an automobile frame, of a stud shaft journaled thereon, a worm-gear-segment and a relatively rigid T-lever mounted on said shaft, a ball lever mounted co-axially with said T-lever, a bar carried by and secured to lugs on said T-lever, a slotted opening in said ball lever, said bar passing through said opening, washers on said bar on either side of said ball lever, springs positioned around said bar and between said lugs and washers and means for actuating said segment, substantially as described.

2. In a steering controller the combination with an automobile frame, of a stud shaft journaled thereon, a worm-gear-segment and a relatively rigid T-lever mounted on said shaft, a ball lever mounted co-axial with said T-lever, a bar carried by and secured to lugs on said T-lever, a slotted opening in said ball lever, said bar passing through said opening, springs positioned around said bar and between said lugs and ball lever, a rod, connecting said ball lever with the front axle of the automobile, and means to actuate said segment, substantially as described.

In testimony whereof I affix my signature in the presence of two witnesses.

PHILIP A. WEIGEL.

Witnesses:
 MAHLON VAN BOOSKIRK,
 JAMES S. CLIFFORD.